United States Patent [19]

Nae

[11] Patent Number: 6,130,256

[45] Date of Patent: Oct. 10, 2000

[54] ORGANOCLAY THICKENER COMPATIBLE WITH SYSTEM TO BE THICKENED

[75] Inventor: Hemi Nae, Princeton Junction, N.J.

[73] Assignee: Rheox, Inc., Hightstown, N.J.

[21] Appl. No.: 08/066,773

[22] Filed: May 7, 1993

[51] Int. Cl.[7] ............................... B01J 13/00; C08J 3/09; C09D 11/06
[52] U.S. Cl. ..................... 516/34; 106/31.3; 106/31.57; 507/901; 508/136; 516/101; 556/173
[58] Field of Search ................................ 252/309, 315.2, 252/28; 507/901; 556/173; 106/22 E, 23 E, 28 R, 31.34, 31.57; 516/31, 101, 34; 508/136

[56] References Cited

U.S. PATENT DOCUMENTS

| | | | |
|---|---|---|---|
| 2,622,987 | 12/1952 | Ratcliffe | 252/315.2 X |
| 2,859,234 | 11/1958 | Clem | 556/173 |
| 4,105,578 | 8/1978 | Finlayson et al. | 252/315.2 |
| 4,193,806 | 3/1980 | Finlayson | 106/20 |
| 4,208,218 | 6/1980 | Finlayson | 252/315.2 X |
| 4,410,364 | 10/1983 | Finlayson et al. | 106/20 |
| 4,412,018 | 10/1983 | Finlayson et al. | 252/315.2 X |
| 4,434,075 | 2/1984 | Mardis et al. | 252/315.2 |
| 4,450,095 | 5/1984 | Finlayson | 252/315.2 |
| 4,664,820 | 5/1987 | Magavran et al. | 252/28 |
| 5,178,672 | 1/1993 | Miller | 106/28 R |

OTHER PUBLICATIONS

NLGI lubricating grease guide, 1984 revised 1987, pp. 2.14 to 2.17, 4.12 to 5.01.

Boner, Modern Lubricating greases, 1976 pp. 2.26–2.27, 3.16 to 3.19 and 6.12 to 6.13.

*Primary Examiner*—Richard D. Lovering
*Attorney, Agent, or Firm*—Michael J. Cronin

[57] ABSTRACT

An organophilic clay thickener for natural oil systems comprising the reaction product of a smectite-type clay and an organic cation in an amount of from about 75% to about 150% of the cation exchange capacity of the smectite-type clay. Said organophilic clay comprising at least one naturally occurring, resulting in increased efficiency as a thickener in natural oil systems.

10 Claims, 2 Drawing Sheets

ORGANOCLAY THICKENER COMPATIBLE WITH SYSTEM TO BE THICKENED

BACKGROUND AND SUMMARY OF THE INVENTION

The present invention relates to organophilic clay thickeners which are dispersible in non-aqueous fluids to thicken such fluids by forming a gel therein or otherwise modifying the viscosity of such fluids. The invention also pertains to a process for preparing these organophilic clay gellants, and to non-aqueous fluid compositions including the same.

It is well known that organic compounds containing a cation will react with a clay under favorable conditions by ion exchange to form an organophilic clay. Such clay modification results in a product which unlike clay is dispersible in non-aqueous fluids to change fluids characteristics such as viscosity. It is also known in the art that such organophilic clays can be used to modify the viscosity (thicken) of a variety of organic compositions including inks, greases, drilling fluids, paints and other similar products. See for example, U.S. Pat. No. 2,966,506 and the book *Clay Mineralogy*, 2nd Ed., 1968, R. E. Grim (McGraw Hill Book Company).

It is also well known that such complexes may function to thicken polar or non-polar petroleum based solvents, depending on the substituents on the organic salt. J. W. Jordan, in "Proceedings of the 10th National Conference on Clays and Clay Minerals" (1963), discusses a wide range of applications of organophilic clays.

In some situations the efficiency of organophilic clays can be further improved by adding a low molecular weight polar organic material to the composition. Such polar organic materials have been called dispersants, dispersion aids, solvating agents and the like. The most efficient polar materials for use as such have been found to be low molecular weight alcohol and ketones, particularly methanol and acetone. See for example U.S. Pat. Nos. 2,677,661, 2,704,276, 2,833,720, 2,879,229 and 3,294,683. The use of such dispersion aids has in other situations been found to be unnecessary when using specially designed organoclays. See U.S. Pat. Nos. 4,105,578 and 4,208,218.

Furthermore, U.S. Pat. Nos. 3,977,897, 4,382,868 and 4,464,274 describe the preparation of preactivated organophilic clay gellants, used to thicken organic compositions wherein the activators are admixed with the organophilic clays.

More recently, organophilic clay gellants have been developed which are the reaction products of smectite-type clays with organic cations and organic anion combinations. These gellants have the advantage of being effectively dispersible in particular organic compositions. An illustrative patent which describes such improved organophilic clay gellants is U.S. Pat. No. 4,412,018.

There is today a growing demand for products based on naturally occurring oils such as soybean oil, safflower oil, corn oil, palm oil and the like, to replace organic solvents based on petroleum derivatives such as toluene, xylene or mineral spirits. Such solvents have more beneficial properties from environmental standpoints and in many ways create more efficacious products.

Relatively large amounts of the organoclay compositions are needed to impart the required viscosity in such systems, especially in those containing natural occurring oils. It is therefore an objective of this invention to provide an efficient thickener to impart the required viscosity to non-aqueous coating systems, and in particular, to systems based on naturally occurring oils.

SUMMARY OF THE INVENTION

The instant invention is based on the unexpected discovery that an organophilic clay made in whole on in part with an organic cation containing ligands or moieties derived from a specific naturally occurring oil imparts a better viscosity to systems utilizing the same or similar natural oil as a solvent than is achieved by conventional organophilic clay gellants.

A new type of organophilic clay thickener has therefore been discovered which thickens coating systems comprised of or containing naturally occurring oils including vegetable oils. It has been unexpectedly discovered that these special organophilic clays are very efficient without affecting the other properties required from the system.

Thus, according to one aspect of the invention, an organophilic clay thickener is provided which comprises the reaction product of a smectite type clay and an organic cation containing a naturally occurring oil residue in an amount of from 75% to about 150% of the cation exchange capacity of the smectite type clay. Optionally, the organophilic clay may contain several such organic cations as well as cations of other types and in addition various anions. Such cations may contain aliphatic, aromatic or alkoxylated quaternary salts.

The present invention also contemplates a process for preparing an organophilic clay thickener for a naturally occurring oil which comprises:

(a) preparing an aqueous slurry of a smectite-type clay;

(b) adding to the slurry an organic cation derived from the same naturally occurring oil residue occurring in an amount of from about 75% to about 150% of the cation exchange capacity of the smectite-type clay; and optionally, other cation and/or an anion; and (c) reacting the resulting mixture for a sufficient time to form an organophilic clay gellant.

The first and other organic cations may be added to the clay slurry separately in any order or simultaneously.

The invention also provides non-aqueous solvent compositions thickened with the above-indicated organophilic clay thickeners.

DESCRIPTION OF THE PREFERRED EMBODIMENTS

Figure 1:
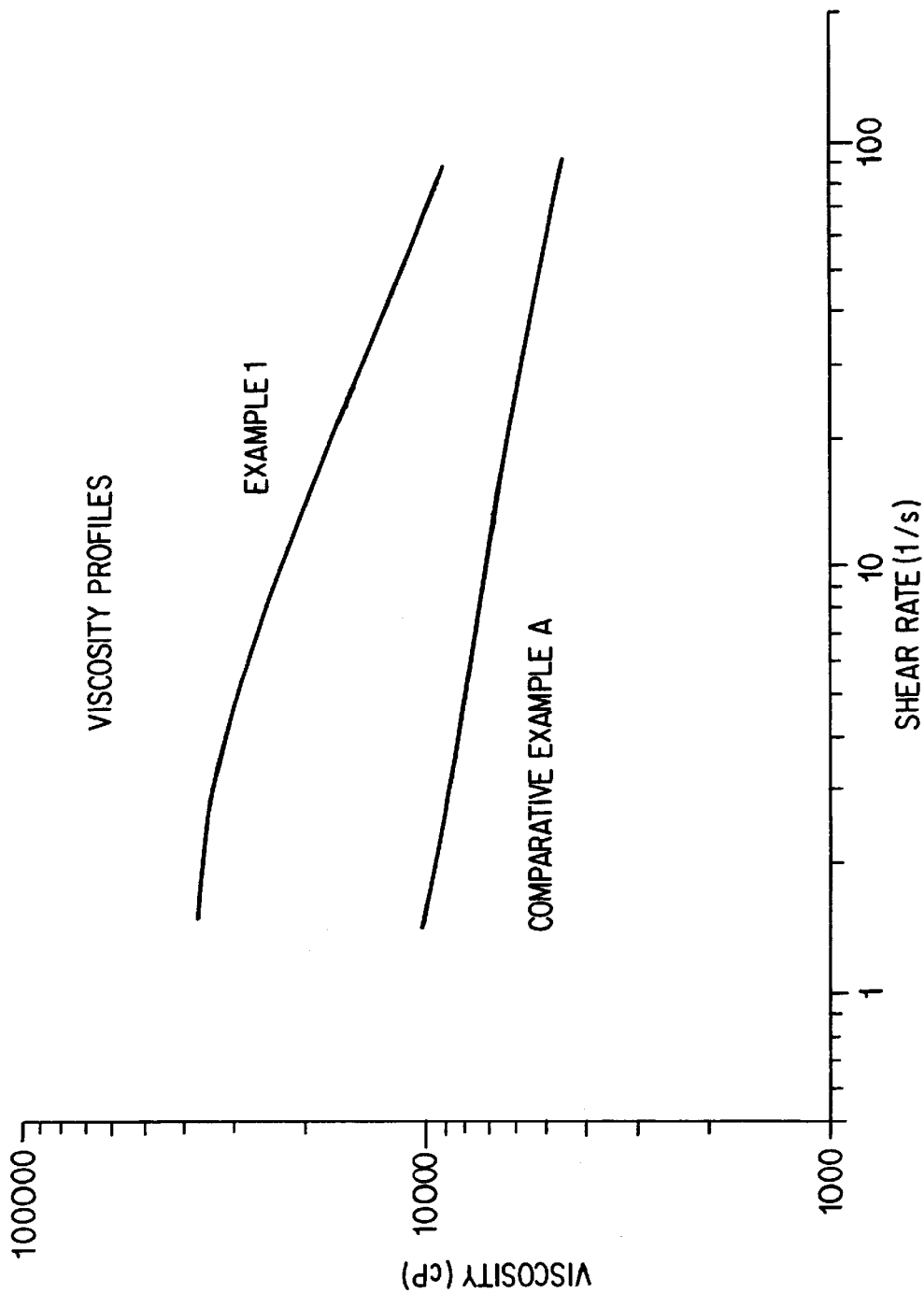

As stated above, one aspect of the present invention relates to an improved, more efficient organophilic clay thickener for naturally occurring oil systems. The organophilic clay is prepared by reacting a smectite-type clay with an organic cation derived from a selected compatible naturally occurring oil residue, and optionally with other organic cations such as alkoxylated quaternary ammonium salts. The combination of a special designed compatible organoclay having a specific cation component, to match and thicken the naturally occurring fluid is believed to be unique.

While not wishing to be bound by any theory, it is believed that the naturally occurring oil residue which forms part of the organophilic clay after reaction renders the organophilic clay more compatible with the non-aqueous composition of the same general type, thus enabling the system to form a three dimensional network structure which in turn provides the composition with its enhanced rheological properties.

According to a first aspect of the invention, an organophilic clay thickener is provided which comprises the reaction product of a smectite-type clay and an organic cation containing a naturally occurring oil residue in an amount of from about 75% to about 150% of the cation exchange capacity of the smectite-type clay.

The preferred clay which is used in the present invention is a smectite-type clay having a cationic exchange capacity of at least 75 milliequivalents per 100 grams of clay as determined by the well-known ammonium acetate or methylene blue methods. Smectite-type clays are well known in the art and are commercially available from a variety of sources. Prior to use in the formulations of the instant invention, the clays are preferably converted to the sodium form if they are not already in this form. Smectite-type clays prepared synthetically may also be used to prepare the novel organic clay complexes of the invention.

Representative of smectite-type clays useful in accordance with the present invention are the following: montmorillonite, bentonite, beidellite, hectorite, saponite, stevensite, sauconite, nontronite and the like and mixtures thereof. Both processed and unprocessed clays can be used. The preferred clays used in the present invention are bentonite and hectorite.

In addition, smectite-type clays which have been subjected to the application of shear may also be used. To achieve shearing of the smectite-type clay, the clay is typically dispersed in water at a concentration of from about 0.5 to about 80% by weight. The slurry may optionally be first centrifuged to remove non-clay impurities which constitute about 10% to about 50% of the starting clay composition. Of course, if the clay has previously been treated, such as by the clay vendor, to remove the impurities, the treated clay can be formed into a slurry and subjected to shear conditions. Shear can be imparted to the smectite-type clay slurry by means of commercially available equipment that is known to impart high shear to the material. Representative processes for shearing smectite clay are described in U.S. Pat. Nos. 4,695,402 and 4,743,098.

The organic salts which are useful in this invention may be selected from a variety of materials that are capable of forming an organoclay by exchange of cations with the smectite-type clay. The organic cations which are reacted with the smectite-type clay have a positive charge localized on a single atom or on a small group of atoms within the compound. For example, the cation may be provided by a compound selected from the group consisting of quaternary ammonium salts, phosphonium salts, sulfonium salts and mixtures thereof. The organic cation should contain at least one residue of a naturally occurring oil. The remaining groups of the cation may be selected from the group consisting of (a) linear or branched aliphatic, alicyclic or aromatic groups having 1 to 22 carbon atoms; (b) aralkyl groups which are benzyl and substituted benzyl moieties including fused ring moieties having linear or branches 1 to 22 carbon atoms in the alkyl portion of the structure; (c) aryl groups such as phenyl and substituted phenyl including fused ring aromatic substituents; (d) beta, gamma-unsaturated groups having six or less carbon atoms or hydroxyalkyl groups having 2 to 6 carbon atoms; and (e) hydrogen. The naturally occurring oil residue may be derived from naturally occurring oils such as corn oil, coconut oil, soybean oil, cottonseed oil, castor oil, linseed oil, safflower oil, palm oil, peanut oil, tung oil and the like. The oil may be of natural sources or a synthetic version of same or modifications of a naturally occurring oil using known techniques.

The organic cation can be provided by a compound selected from the group consisting of at least one of the following formulae:

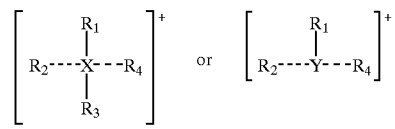

wherein X is nitrogen or phosphorous, Y is sulfur, $R_1$ is a linear or branched, saturated or unsaturated residue of a natural oil and $R_2$, $R_3$ and $R_4$ are independently selected from the group consisting of (a) linear or branched alkyl groups having 1 to 22 carbon atoms; (b) aralkyl groups which are benzyl and substituted benzyl moieties including fused ring moieties having linear chains or branches of 1 to 22 carbon atoms in the alkyl portion of the structure; (c) aryl groups such as phenyl and substituted phenyl including fused ring aromatic substituents; (d) beta, gamma unsaturated groups having six or less carbon atoms or hydroxyalkyl groups having 2 to 6 carbon atoms; and (e) hydrogen. It should be understood that $R_2$, $R_3$, or $R_4$ can also be the residues of natural oils in lieu of a) through e). U.S. Pat. No. 4,664,820 describes some of such organic salts.

The anion which will normally accompany the organic cation is typically one that will not adversely affect the reaction product. Such anions include, for example, chloride, bromide, iodide, hydroxyl, nitrite and acetate.

The preparation of the organic salt can be achieved by techniques well-known in the art. For example, when preparing a quaternary ammonium salt, one skilled in the art would prepare a dialkyl secondary amine, for example, by the hydrogenation of nitriles, and then form the methyl dialkyl tertiary amine by reductive alkylations using formaldehyde as a source of the methyl radical.

The other organic cations utilized in the products of the invention comprise quaternary salts which contain aliphatic, aromatic or alkoxy moieties.

Illustrative examples of suitable alkoxylated quaternary ammonium chloride compounds include those available under the tradename Ethoquad from Akzo Chemicals, namely, methyl bis(2-hydroxyethyl)cocoalkyl ammonium chloride, methyl bis(polyoxyethylene (15)) cocoalkyl quaternary ammonium chloride, methyl bis(2-hydroxyethyl) oleyl ammonium chloride, methyl bis(polyoxyethylene (15)) oleyl quaternary ammonium chloride, methyl bis(2-hydroxyethyl) octadecyl ammonium chloride, and methyl bis(polyoxyethylene (15)) octadecyl quaternary ammonium chloride.

The present invention also contemplates a process for preparing an organophilic clay thickener for a naturally occurring oil which comprises:

(a) preparing an aqueous slurry of a smectite-type clay;

(b) adding to said slurry an organic cation derived from a naturally occurring oil residue of the type of the naturally occurring oil to be thickened in an amount of from about 75% to about 150% of the cation exchange capacity of the smectite-type clay; and optionally, other organic cations and reacting the resulting mixture for a sufficient time to form an organophilic clay thickener.

The organoclays of this invention may be prepared by admixing the clay, organic salts and water together, preferably at temperatures within the range from 20° C. to 100° C., and most preferably from 35° C. to 80° C. for a period of time sufficient for the organic compounds to react with the clay. The reaction is followed by filtering, washing, drying and grinding. The organic salts may be added simultaneously or at separate intervals.

The amount of organic salts added to the clay for purposes of this invention must be sufficient to impart to the clay the improved gelling and dispersion characteristics. This amount is defined as the milliequivalent ratio, which is the number of milliequivalents (m.e.) of the organic salt in the organoclay per 100 grams of clay, 100% active clay basis.

It should also be understood that a mixture of organic salts can be utilized including a mixture of a quaternary compatible with the system to be thickened with a quaternary which is not so compatible. For example a soya oil based ink can be thickened using an organoclay made with a soya based quaternary and a non soya based quaternary.

The organophilic clay gellants prepared according to this invention may be used as rheological additives in non-aqueous compositions such as inks, paints, varnishes, enamels, waxes, paint-varnish, oil base drilling fluids, lubricants and grease, polyesters, epoxy resins, adhesives, sealants, cosmetics, detergents, and the like. Consequently, the invention also provides non-aqueous solvent compositions thickened with the above-indicated organophilic clay thickener.

The organophilic clay complexes of the invention are added to the non-aqueous compositions in amounts sufficient to obtain the desired rheological properties. Amounts of the organophilic clay complexes in the non-aqueous compositions are from about 0.01% to 15%, preferably from about 0.3% to 5%, based on the total weight of the non-aqueous fluid system.

The following examples are given to illustrate the invention, but are not deemed to be limiting thereof.

EXAMPLE 1

This example illustrates the preparation of an organophilic clay gellant composition according to the present invention.

45.00 grams of dried bentonite clay, which has been previously treated in water by centrifugation to remove non-clay impurities and ion-exchanged to provide the clay in sodium form, is mixed with water to form a 3% by weight slurry of clay in water. The slurry is heated to 70° C. in a reaction flask of suitable size equipped with a stirrer, thermometer and addition funnel. 21.61 grams of trimethyl soya quaternary ammonium chloride (140 milliequivalents per 100 grams of clay solids) dissolved in 21.61 grams of isopropanol is added to the mixture. The mixture is stirred for 1 hour at 70° C. The product is filtered through a Buchner funnel to collect the solids. The wet solids are reslurried in 1500 grams of water at 70° C. for 20 minutes and then re-collected on a Buchner funnel. The filtercake is dried in a 60° C. oven for 16 hours.

COMPARATIVE EXAMPLE A

For comparative purposes, the procedure of Example 1 is repeated, except that dimethyl dihydrogenated tallow quaternary ammonium chloride is the organic salt used.

EXAMPLE 2

This Example illustrates the preparation of an organophilic clay gellant containing two types of organic salts according to the present invention.

45.00 grams of dried bentonite clay, which has been previously treated in water by centrifugation to remove non-clay impurities and ion-exchanged to provide the clay in sodium form, is mixed with water to make a 3% by weight slurry of clay in water. The slurry is heated to 70° C. in a reaction flask of suitable size equipped with a stirrer, thermometer and addition funnel. 0.18 grams of methyl bis(2-hydroxyethyl) oleyl quaternary ammonium chloride (1 milliequivalent per 100 grams of clay solids), and 21.61 grams of trimethyl soya quaternary ammonium chloride (140 milliequivalents per 100 grams of clay solids) in 21.61 grams of isopropanol is added to the mixture. The mixture is stirred for 1 hour at 70° C. and then filtered through a Buchner funnel to collect the solids. The wet solids are reslurried in 1500 grams of water at 70° C. for 20 minutes and then re-collected on a Buchner funnel. The filtercake is dried at 60° C. in an oven for 16 hours.

EXAMPLE 3–5

These Examples demonstrate the dispersion and viscosity-build properties provided when the organophilic clay gellants are used in a soya bean oil based ink formulation. A red soya news ink formulation is prepared according to Formulation 1.

FORMULATION 1

Soya News Red Ink Formula

| Ingredient | Generic Name | Manufacturer | Formulation (parts by wt.) |
| --- | --- | --- | --- |
| LR 6247 SB Lithol Rubine | Flushed Color | Magruder Color | 26.25 |
| Special T Blown Soya Oil | Oxidized Soya Bean Oil $Z_2$–$Z_4$ | Spencer-Kellogg Div. Reichhold Chemicals | 40.27 |
| Mix at 8000 rpm until uniform, then add: | | | |
| Polar Activator | Propylene Carbonate/ Water | | 0.76 |
| Rheological Additive | | | 3.78 |
| Disperse at 8000 rpm for 20 minutes, then add as letdown: | | | |
| Superior Soya Oil | Highly Refined Soybean Oil A | Spencer-Kellogg Div. Reichhold Chemicals | 28.94 |
| Total | | | 100.00 |

A red ink is prepared according to Formulation 1. The ink is allowed to equilibrate at room temperature for 24 hours. Tack and misting are measured with a Thwing-Albert Inkometer operating at 1200 rpm and 90° F. Tack is measured according to ASTM Method D4361-84 entitled "Apparent Tack of Printing Inks by the Inkometer."

NPIRI (National Printing Ink Research Institute grind values are measured to evaluate dispersion according to ASTM Method D1316-68 entitled "Fineness of Grind of Printing Inks by the Production Grindometer." Viscosity for the ink formulations are determined using a Brookfield RVT Viscometer with a No. 15 spindle. Dispersion measurements, Brookfield viscosities, tack, and misting are presented in Table 1.

Figure 2:
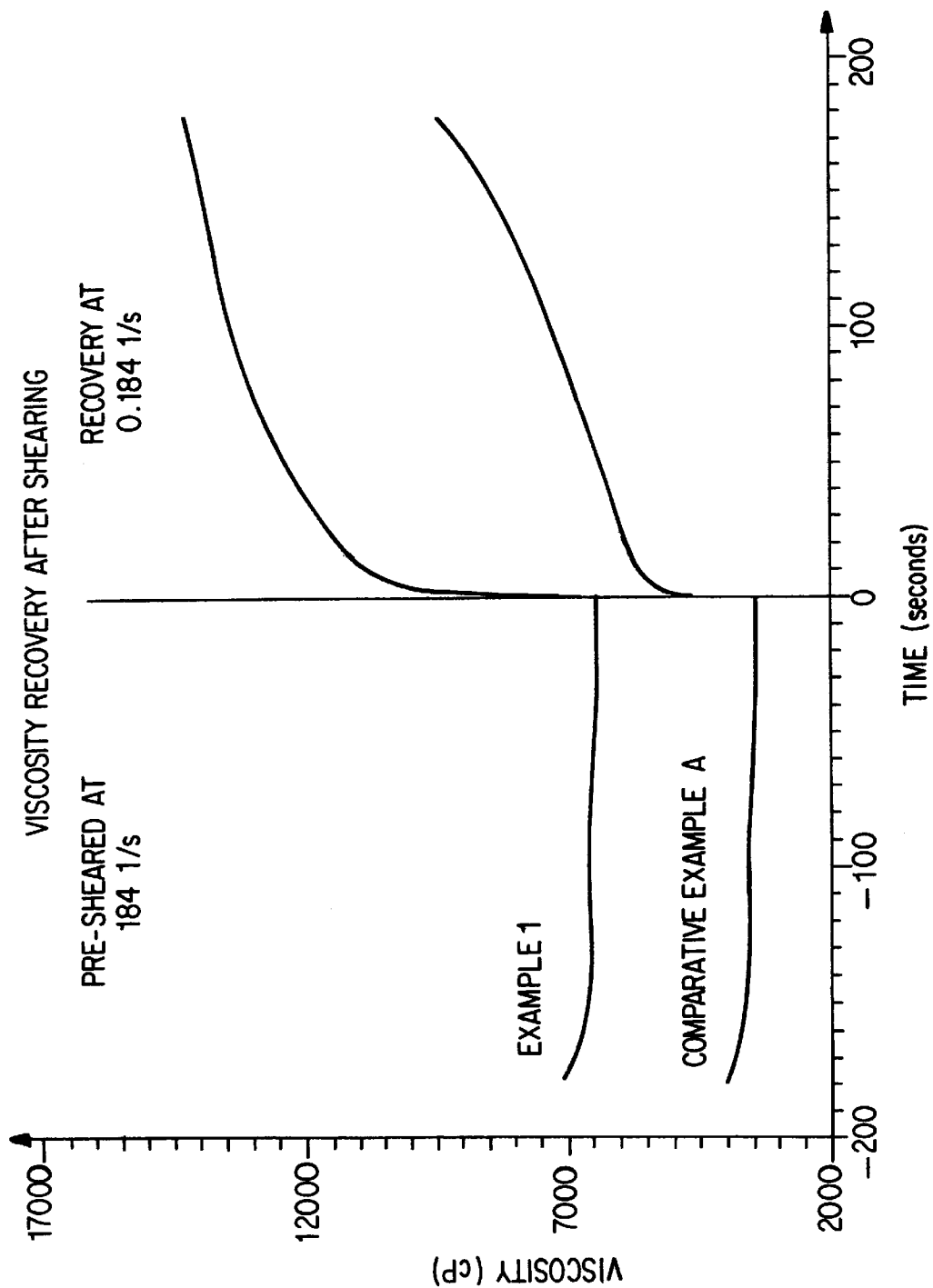

The high efficiency of the organophilic clay of the invention is demonstrated in FIG. 1. The graph shows viscosity profiles (viscosity as a function of shear rate) of two soya bean oil based inks. It is obvious that the efficiency of the ink containing the organophilic clay of the invention (example 1) is superior to that exhibited by an ink system containing the same amount of comparative example A. FIG. 2 shows the recovery of viscosity after shearing the ink at high shear rates. In this experiment, an ink composition according to Formulation 1 is sheared at a shear rate of 184 1/S for 180 seconds and then the increase in viscosity is monitored at a shear rate of 0.184 1/S as a function of time. The test is performed using a Bohlin VOR Rheometer (Bohlin Instruments, Cranbury, N.J.).

TABLE 1

| Ex. | Organic salt | Grind | Tack | Misting | Brookfield Visc. 20 rpm | Brookfield Visc. 2.5 rpm |
|---|---|---|---|---|---|---|
| 3 | trimethyl soya[a] | 0/18 M | 6.4 | F | 14375 | 17500 |
| 4 | trimethyl soya/methyl bis(2-hydroxyethyl)oleyl[b] | 0/07 LM | 6.7 | F | 13125 | 16000 |
| 5 | dimethyl dihydrogenated tallow[c] | 0/1 LM | 5.5 | F | 5125 | 11500 |

M = Medium; LM: = Light Medium; F = Fair
[a]example 1; [b]example 2; [c]comparative example A

EXAMPLE 6

This Example illustrates the preparation of an organophilic clay gellant containing an organic cation and an organic anion.

45.00 grams of dried bentonite clay, which has been previously treated in water by centrifugation to remove non-clay impurities and ion-exchanged to provide the clay in sodium form, is mixed with water to make a 3% by weight slurry of clay in water. The slurry is heated to 70° C. in a reaction flask of suitable size equipped with a stirrer, thermometer and addition funnel. 1.72 grams of sodium stearate (12.5 milliequivalents per 100 grams of solids) in 50 grams water and 21.61 grams of trimethyl soya quaternary ammonium chloride (140 milliequivalents per 100 grams of clay solids) is added to the mixture. The mixture is stirred for 1 hour at 70° C. and then filtered through a Buchner funnel to collect the solids. The wet solids are reslurried in 1500 grams of water at 70° C. for 20 minutes and then re-collected on a Buchner funnel. The filtercake is dried at 60° C. in an oven for 16 hours.

EXAMPLES 7–14

These examples illustrate the effect of drying conditions on the properties provided when the organophilic clay gellants in Example 1 and Comparative Example A are used in a soya bean oil based ink formulation. Dispersion measurements, Brookfield viscosity, tack and misting are presented in Table 2.

TABLE 2

| Ex. | Drying Method | Temperature | Grind | Tack | Misting | Brookfield Visc. 20 rpm | Brookfield Visc. 2.5 rpm |
|---|---|---|---|---|---|---|---|
| 7 (a) | Forced air oven | 65° C. | 0/16 M | 6.7 | F | 15000 | 18500 |
| 8 (b) | Forced air oven | 65° C. | 0/10 M | 5.7 | F | 5312 | 13000 |
| 9 (a) | Forced air oven | 85° C. | 0/18 MH | 6.3 | F | 13500 | 16500 |
| 10 (b) | Forced air oven | 85° C. | 0/24 MN | 5.3 | F | 5375 | 12500 |
| 11 (a) | Fluid bed dryer | 65° C. | 0/18 M | 6.4 | F | 14375 | 17500 |
| 12 (b) | Fluid bed dryer | 65° C. | 0/10 LM | 5.5 | F | 5125 | 11500 |
| 13 (a) | Fluid bed dryer | 93° C. | 0/12 M | 6.5 | F | 12875 | 15000 |
| 14 (b) | Fluid bed dryer | 93° C. | 0/06 LM | 5.8 | F | 5125 | 11000 |

(a) Example 1; (b) Comparative Example A
M = Medium    H = Heavy    L = Light    F = Fair

EXAMPLES 15–20

These examples illustrate the effect of the amount of the organic cation in the organophilic clay on the properties provided when the organophilic clay gellant is used in a soybean oil based ink formulation. Dispersion, Brookfield viscosity, tack and misting are presented in Table 3. The preparation of the organophilic is given in Example 1.

TABLE 3

| Ex. | Meq/100 Clay | Grind | Tack | Misting | Brookfield Visc. 20 rpm | Brookfield Visc. 2.5 rpm |
|---|---|---|---|---|---|---|
| 15 | 100 | 0/30 H | 6.2 | F | 4750 | 5500 |
| 16 | 110 | 0/29 MH | 6.5 | F | 9875 | 11500 |
| 17 | 120 | 0/29 M | 6.4 | F | 20500 | 29500 |
| 18 | 130 | 0/27 LM | 6.6 | F | 15250 | 20000 |
| 19 | 140 | 0/18 M | 6.4 | F | 14375 | 17500 |
| 20 | 150 | 0/18 M | 6.4 | F | 10250 | 13000 |

H = Heavy    M = Medium    L = Light    F = Fair

EXAMPLES 21–23

These examples illustrate the effect of the organic anion in the organophilic clay on the properties provided when the organophilic clay gellant is used in a soybean oil based ink formulation. Dispersion, Brookfield viscosity, tack and misting are presented in Table 4. The preparation of the organophilic clay is given in Example 6.

TABLE 4

| Ex. | Organic Anion | Grind | Tack | Misting | Brookfield Visc. 20 rpm | Brookfield Visc. 2.5 rpm |
|---|---|---|---|---|---|---|
| 19 | none | 0/18 M | 6.4 | F | 14375 | 17500 |
| 21 | stearate | 0/08 LM | 6.8 | F | 14500 | 16500 |
| 22 | succinate | 0/24 LM | 5.7 | F | 8125 | 9000 |
| 23 | palmitate | 0/12 LM | 5.7 | F | 10500 | 12000 |

Based on the results, it is apparent that the organophilic clay compositions provided by the invention are highly effective in improving the rheological properties of non-aqueous systems.

The invention thus being described, it will be obvious that the same may be varied in many ways. Such variations are not to be regarded as a departure from the spirit and scope of the invention and all such modifications are intended to be included within the scope of the claims.

What is claimed is:

1. An organophilic clay thickener for soya oil systems comprising the reaction production of:
   (a) a smectite-type clay; and
   (b) an organic cation derived from a soya oil residue in an amount of from about 75% to about 150% of the cation exchange capacity of the smectite-type clay.

2. The organophilic clay thickener of claim 1, wherein said smectite type clay is selected from the group consisting of montmorillonite, bentonite, beidellite, hectorite, saponite, stevensite, sauconite and nontronite and mixtures thereof.

3. The organophilic clay thickener of claim 1, wherein said organic cation is provided by a compound selected from the group consisting of quaternary ammonium salts, phosphonium salts, sulfonium salts, and mixtures thereof.

4. The organophilic clay thickener of claim 1, wherein said organic cation is provided by a compound selected from the group consisting of:

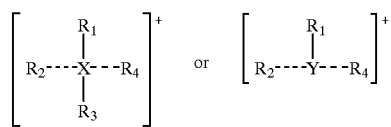

wherein X is nitrogen or phosphorous, Y is sulfur, $R_1$ is a residue of a soya oil and $R_2$, $R_3$ and $R_4$ are independently selected from the group consisting of (a) linear or branched alkyl groups having 1 to 22 carbon atoms; (b) aralkyl groups which are benzyl and substituted benzyl moieties including fused ring moieties having linear chains or branches of 1 to 22 carbon atoms in the alkyl portion of the structure; (c) aryl groups; (d) beta, gamma unsaturated groups having six or less carbon atoms or hydroxyalkyl groups having 2 to 6 carbon atoms; and (e) hydrogen; wherein $R_2$, $R_3$ and $R_4$ may also be residues of naturally occurring soya oil in lieu of (a) to (e).

5. The organophilic clay thickener of claim 1 further comprising an organic anion.

6. The organophilic clay thickener of claim 5, wherein said organic anion is provided by a compound selected from the group consisting of stearic acid, palmitic acid, succinic acid, their corresponding salts and mixtures thereof.

7. The organophilic clay thickener of claim 1 including a second organic cation wherein said second organic cation is derived from aliphatic, aromatic or alkoxylated groups.

8. A process for preparing an organophilic clay thickener for soya oil systems which comprises:
   (a) preparing an aqueous slurry of a smectite-type clay;
   (b) adding to said slurry an organic cation derived from a soyaoil residue in an amount of about 75% to about 150% of the cation exchange capacity of the smectite-type clay and;
   (c) reacting the resulting mixture for a sufficient time to form an organophilic clay.

9. A non-aqueous fluid system which comprises:
   (a) a soya oil composition and
   (b) an organophilic clay thickener comprising the reaction product of a smectite-type clay and an organic cation derived from a soya oil residue in an amount from about 75% to about 150% of the cation exchange capacity of the smectite-type clay.

10. The non-aqueous fluid system of claim 9, wherein said non-aqueous composition is selected from the group consisting of inks, paints, varnishes, enamels, waxes, paint-varnish, lacquer remover, oil base drilling fluids, lubricating grease, polyesters, epoxy resins, adhesives, sealants, cosmetics and detergents.

* * * * *